(12) United States Patent
Sanchez

(10) Patent No.: US 7,244,103 B2
(45) Date of Patent: Jul. 17, 2007

(54) WINDMILL ROTOR COMPRISING MULTIPLE SEPARATE WIND CHANNELS

(76) Inventor: Felix Sanchez Sanchez, 50010-Zaragoza (ES)

( * ) Notice: Subject to any disclaimer, the term of this patent is extended or adjusted under 35 U.S.C. 154(b) by 0 days.

(21) Appl. No.: 10/535,984

(22) PCT Filed: Jul. 9, 2003

(86) PCT No.: PCT/ES03/00344

§ 371 (c)(1),
(2), (4) Date: May 24, 2005

(87) PCT Pub. No.: WO2005/005823

PCT Pub. Date: Jan. 20, 2005

(65) Prior Publication Data

US 2006/0182632 A1 Aug. 17, 2006

(51) Int. Cl.
B63H 1/16 (2006.01)
B63H 7/02 (2006.01)
(52) U.S. Cl. .................................. 416/189; 416/193 R
(58) Field of Classification Search ............ 416/193 R, 416/175, 189, 192, 203; 415/77, 119
See application file for complete search history.

(56) References Cited

U.S. PATENT DOCUMENTS

| 984,599 | A | | 2/1911 | Pichault |
| 1,232,795 | A | * | 7/1917 | Hagen ..................... 416/193 R |
| 1,263,473 | A | * | 4/1918 | Schellens ..................... 415/77 |
| 2,503,072 | A | * | 4/1950 | Schneider ..................... 415/91 |
| 3,198,423 | A | | 8/1965 | Clute |
| 3,266,734 | A | | 8/1966 | Gahagan |
| 3,485,252 | A | | 12/1969 | Brown |
| 3,783,814 | A | | 1/1974 | Zovko |
| 4,080,100 | A | | 3/1978 | McNeese |
| 4,289,450 | A | | 9/1981 | Kling |
| 5,711,653 | A | | 1/1998 | McCabe |
| 5,755,557 | A | * | 5/1998 | Alizadeh ................. 416/193 R |

(Continued)

FOREIGN PATENT DOCUMENTS

DE 2909781 A1 9/1980

(Continued)

OTHER PUBLICATIONS

Translation of the International Preliminary Examination Search Report for PCT/ES2003/000344 dated Jul. 12, 2005.

(Continued)

*Primary Examiner*—Igor Kershteyn
(74) *Attorney, Agent, or Firm*—Milbank, Tweed, Hadley & McCloy LLP

(57) ABSTRACT

Round honeycomb rotor for wind generators and most propellers has bent tubular trapezoids, two or more concentric tubular cylinders and a variable number of round bent tubular trapezoids. Both cylinders and trapezoids form modular trapezoidal tubes, which have large wind contact surfaces. The concentric tubular cylinders of the round panel have bent pieces fitted in between them whose function is to minimise wind exit and multiply wind contact surfaces in wind generators. As for propeller rotors the number of round bent tubular trapezoids gets multiplied as well as its wind contact surfaces, which results in the optimum use of most centrifugal propelling forces thanks to the reduction of wind entrance and the amplification of wind exit.

1 Claim, 6 Drawing Sheets

U.S. PATENT DOCUMENTS 6,599,085 B2 7/2003 Nadeau et al.

FOREIGN PATENT DOCUMENTS

| DE | 2951635 | A | * | 7/1981 |
|---|---|---|---|---|
| EP | 953 774 | | | 11/1999 |
| GB | 213022 | | | 3/1924 |
| JP | 58091376 | | | 5/2003 |
| WO | WO 2004/002821 | A1 | | 1/2004 |
| WO | WO 2005/085648 | A1 | | 9/2005 |
| WO | WO 2006/045856 | A1 | | 5/2006 |

OTHER PUBLICATIONS

International Search Report for PCT/ES2003/000344 dated Oct. 23, 2003.

* cited by examiner

WINDMILL ROTOR COMPRISING MULTIPLE SEPARATE WIND CHANNELS

This application is a national-stage entry under 35 U.S.C. § 371 based on International Application Serial No. PCT/ES2003/000344, filed Jul. 9, 2003.

The purpose of this patent invention called round honeycomb rotor with bent tubular trapezoids is ideal for wind generators and most propellers. Its purpose is to improve wind generators and propellers performance, which is achieved by a total closure of all the perimeters through the concentric tubular cylinders where the bent pieces, which are mounted upon the tubular cylinders lean on. Everything is assembled in a round honeycomb shape formed by modules of round bent tubular trapezoids, which by receiving all of the wind force multiply over two the number of trapezoids, which at the same time multiply wind contact surfaces over twenty times. Wind generator rotors make the most of the wind force thanks to the multiplication of trapezoids as well as the multiplication of their contact surfaces with the wind. The same applies to most propeller rotors, the multiplication of the number of trapezoids added to the multiplication of their contact surfaces lead to the multiplication and optimum use of the driving centrifugal forces involved.

STATE OF THE ART TECHNIQUE

The technique used in wind generator rotors has varied applications and counts with different dimensions. It generally consists of a pitch with usually three blades fitted in; some models have directional blades easily adaptable to the wind direction. Currently, wind generators and most propellers have their outer perimeters widely open being most of the driving centrifugal forces wasted through the propellers. Conventional wind generators, which have three blades with minimum contact surface, usually achieve quite a low performance in wind speed.

DESCRIPTION OF THE INVENTION

Round honeycomb rotors with round bent tubular trapezoids are ideal for wind generators and most propellers. They consist of several concentric tubular cylinders with bent pieces fitted in between making round tubular trapezoids whose main purpose is to maximise the wind force performance. On the one hand this maximisation in wind generators and propellers is possible by substituting the conventional blades with bent tubular trapezoids, which have the capacity to multiply wind contact surfaces over twenty times. On top of that propellers also maximise most of the propelled centrifugal forces coming from the engine revolutions and going to the blades. On the other hand these trapezoids are fitted into concentric tubular cylinders therefore closing all the trapezoids perimeters giving the rotor a round honeycomb shape. In wind generators the tubular cylinder with largest diameter has fitted in an open funnel with a conical opening facing outwards in order to increase the wind entry surface to the rotor. Bent tubular trapezoids in conventional wind generators have a soft entrance, which goes diminishing towards the exit creating a small pressure. This is natural in this kind of wind rotors as they have wind entrance and exit areas orientated in the same direction. Nevertheless in this present patent invention, the progressive curving of the bent tubular trapezoids will divert the course of the wind to another direction, which will automatically reduce the wind force as it exits like it happens in wind turbines. Propellers in general will have similar characteristics to wind rotors adding the effect of centrifugal forces. With regular winds round bent tubular trapezoids exit areas will have to be fixed or calculated in advance in order to achieve an adequate pressure. With variable winds exit areas will be automatic. The above mentioned round tubular trapezoids are assembled in several concentric tubular cylinders, which have bent pieces inserted in between each one of them giving the whole structure the shape of a round honeycomb with round bent tubular trapezoids inside. Bent tubular trapezoids in wind generators and propellers could be of any of the well-known geometrical shapes such as round, tubular, oval or polygons with as many regular or irregular sides as needed. Inside the trapezoids similar shapes could be adopted or even other ones such as oblique trapezoids or any rough shapes whose only function would be to minimise the wind force. The tubular cylinder with larger diameter in most propellers rotor has fitted in a conical funnel opening inwards that reduces the wind exit surface therefore minimising the wind force as it exits.

Bent tubular trapezoids in most propellers have their entry surfaces smaller than their exit surfaces in order to increase the air pressure. With this technique the present invention will make the most of centrifugal and propelling forces coming from the engine. The same technique applies to wind generators but in this case bent trapezoids will have entry surfaces larger than exit surfaces in order to reduce air pressure, which multiplied by the large rotor surface will produce an important quantity of energy making the most of the wind force on the wind rotor.

Round honeycomb rotors for wind generators and most propellers will have many round bent tubular trapezoids with a surface that multiplies over twenty times in relation to conventional rotors. Their large wind contact surfaces multiply the force on the wind rotor by having all its outwards perimeters completely shut down.

Round honeycomb rotors for wind generators and most propellers with round bent tubular trapezoids have the advantage of multiplying the number of trapezoids and therefore also multiplying the wind contact surface or wind friction on bent pieces thus maximising wind force on the rotor, which in most cases will also be multiplied. Taking into account that trapezoid perimeters will be completely closed by concentric tubular cylinders being optional to have every row lined up or not. This is the foundation of the present patent.

Round honeycomb rotors for wind generators and most propellers will be capable of moving in both directions depending on how the bent pieces in between round bent tubular trapezoids are positioned.

DRAWINGS DESCRIPTION

FIG. 1 is a front view of the round honeycomb rotor for wind generators, in which we can appreciate several concentric tubular cylinders (1) (the drawing shows four tubular cylinders). The tubular cylinder with largest diameter has a funnel fitted in (4) with a conical shape being open outwards in order to maximise the wind entry surface. These tubular cylinders have bent tubular trapezoids (2) fitted in between each of them (the drawing shows twelve/ten/eight/six bent trapezoids in between each concentric cylinder starting with the one having largest diameter and alternating from one diameter to the other). This explains the round honeycomb shape individually composed of round bent tubular trapezoids (5). Finally, we see right in the middle the cube or nucleus (3), which will have the alternator axis fitted in.

FIG. 2 is a front view of the round honeycomb rotor for most propellers, in which we can appreciate several concentric tubular cylinders (6) (the drawing shows four). The tubular cylinder with largest diameter has a funnel fitted in (9) with a conical shape being open inwards in order to minimise the wind exit surface. These concentric cylinders have bent pieces (7) fitted in between each of them (the drawing shows twelve/ten/eight/six bent pieces in between each concentric cylinder starting with the one having largest diameter and alternating from one diameter to the other). This explains the round honeycomb shape with round bent tubular trapezoids (10). Finally, we see right in the middle the cube or nucleus (8), which will have the alternator axis fitted in.

FIG. 3 shows a section of FIG. 1 where we can see a section of a concentric tubular cylinder (1) with the cube or nucleus in the middle (3) and trapezoids width proportions (2), in which we can appreciate their bending. We can also appreciate on the tubular cylinder with largest diameter how a conical shaped funnel is fitted in (4) opening outwards. Round bent tubular trapezoids (5) also have arrows indicating the wind direction.

FIG. 4 shows a section of FIG. 2 where we can see several concentric tubular cylinders (6) with the cube or nucleus in the middle (8) and trapezoids width proportions (7). We can also appreciate on the tubular cylinder with largest diameter how a conical shaped funnel is fitted in (4) opening inwards in order to minimise the wind exit surface. Round bent tubular trapezoids (10) also have arrows indicating the wind direction.

DESCRIPTION OF A PREFERENTIAL PERFORMANCE

Figure 1:
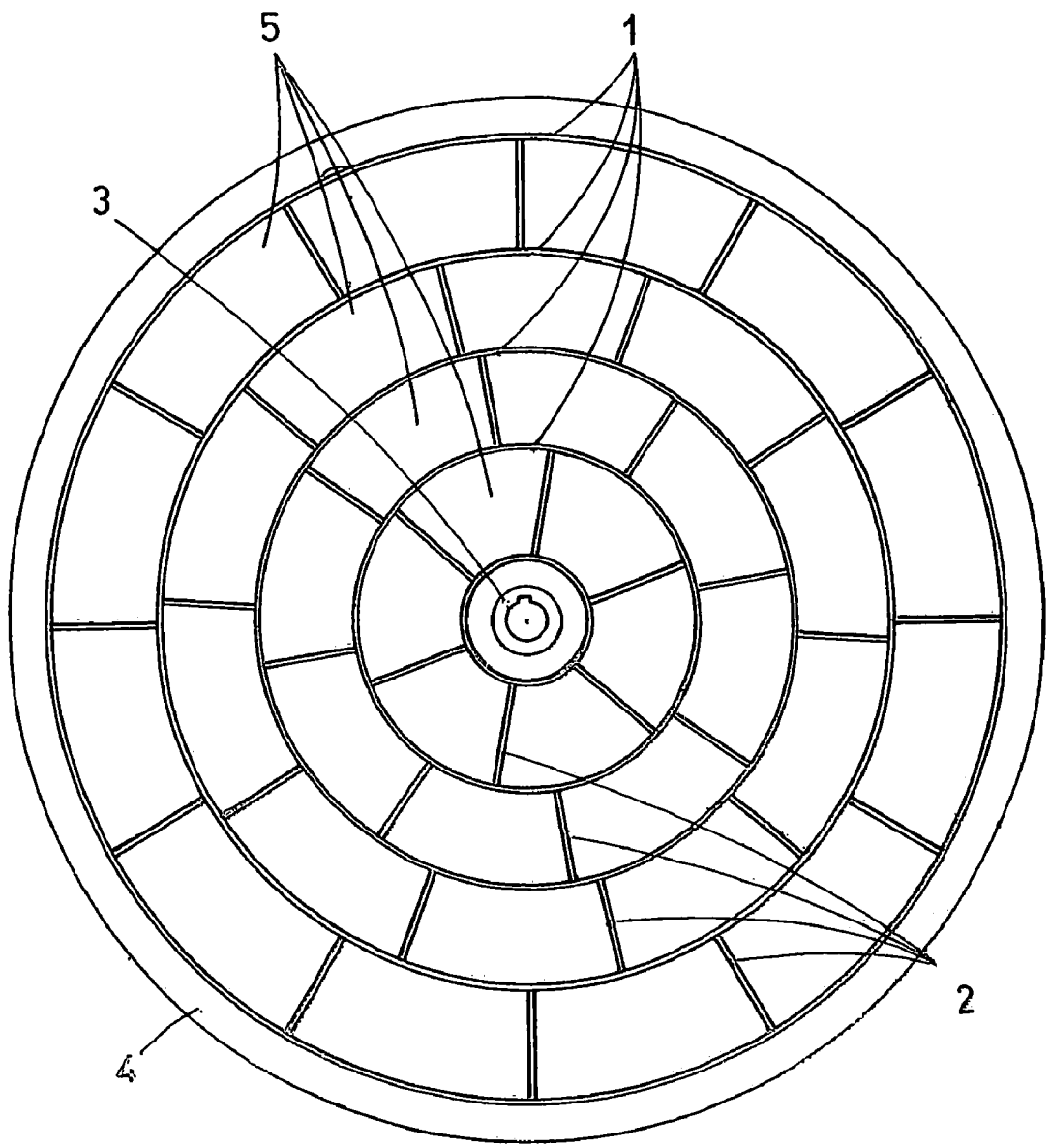
Figure 2:
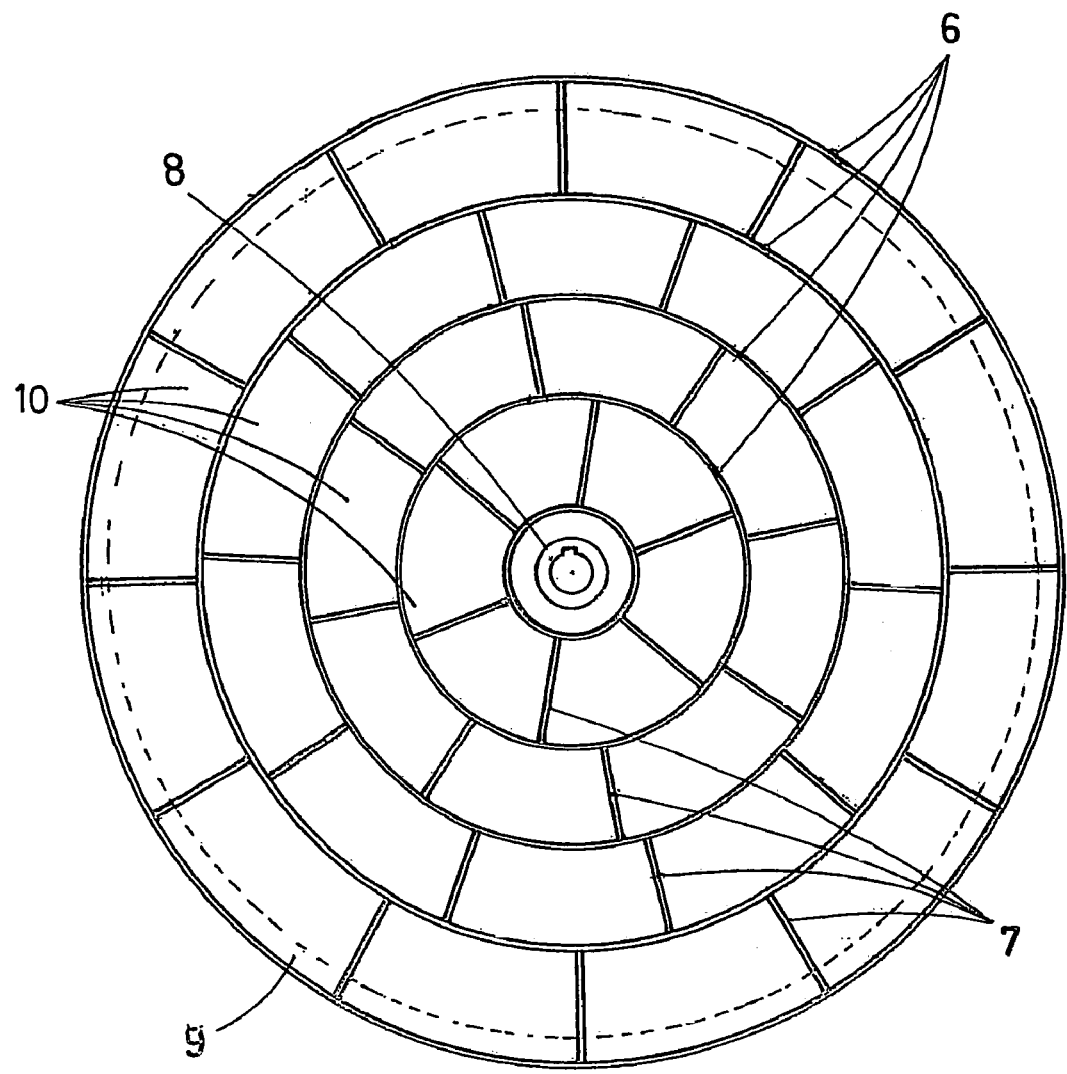
Figure 3:
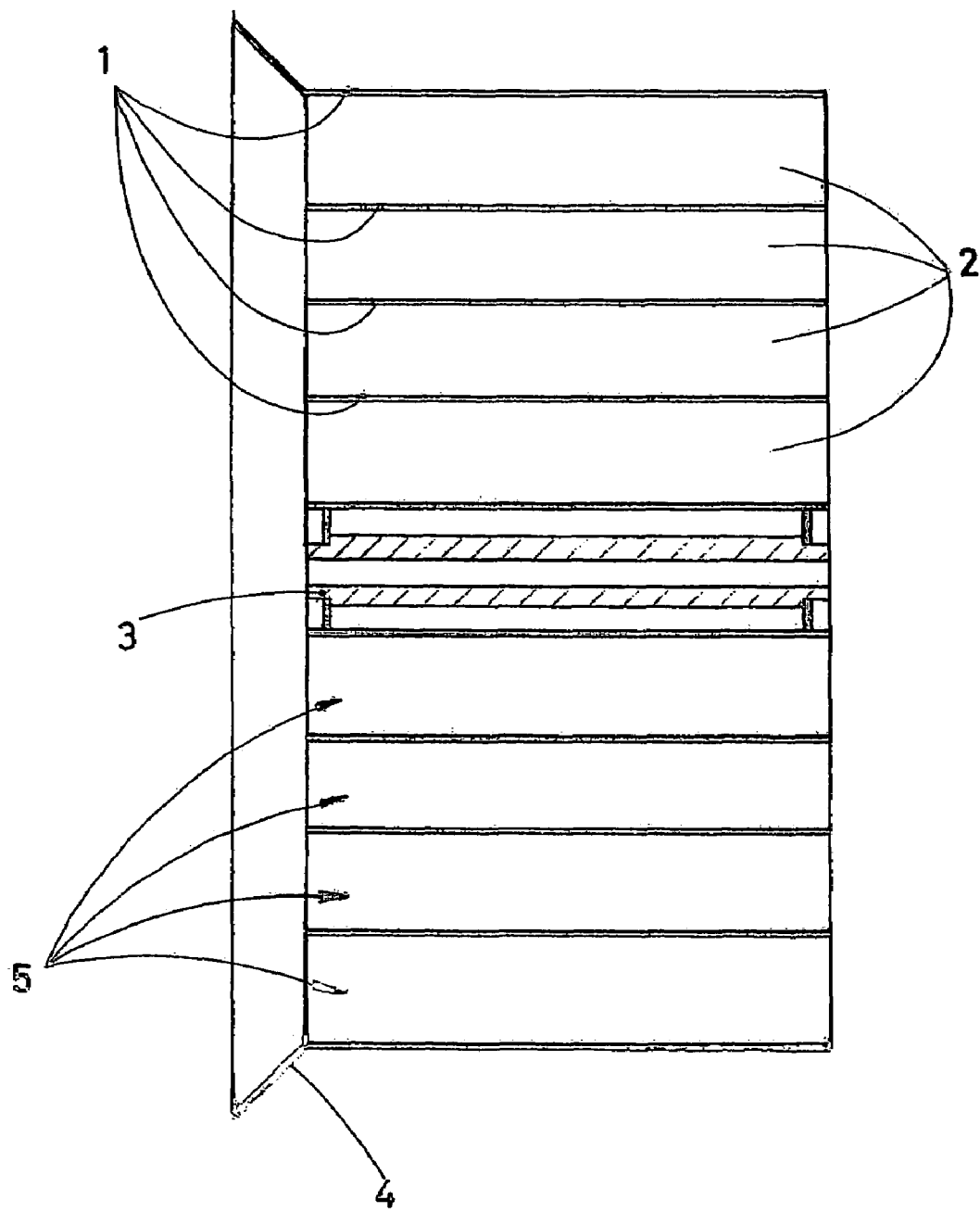
Figure 4:
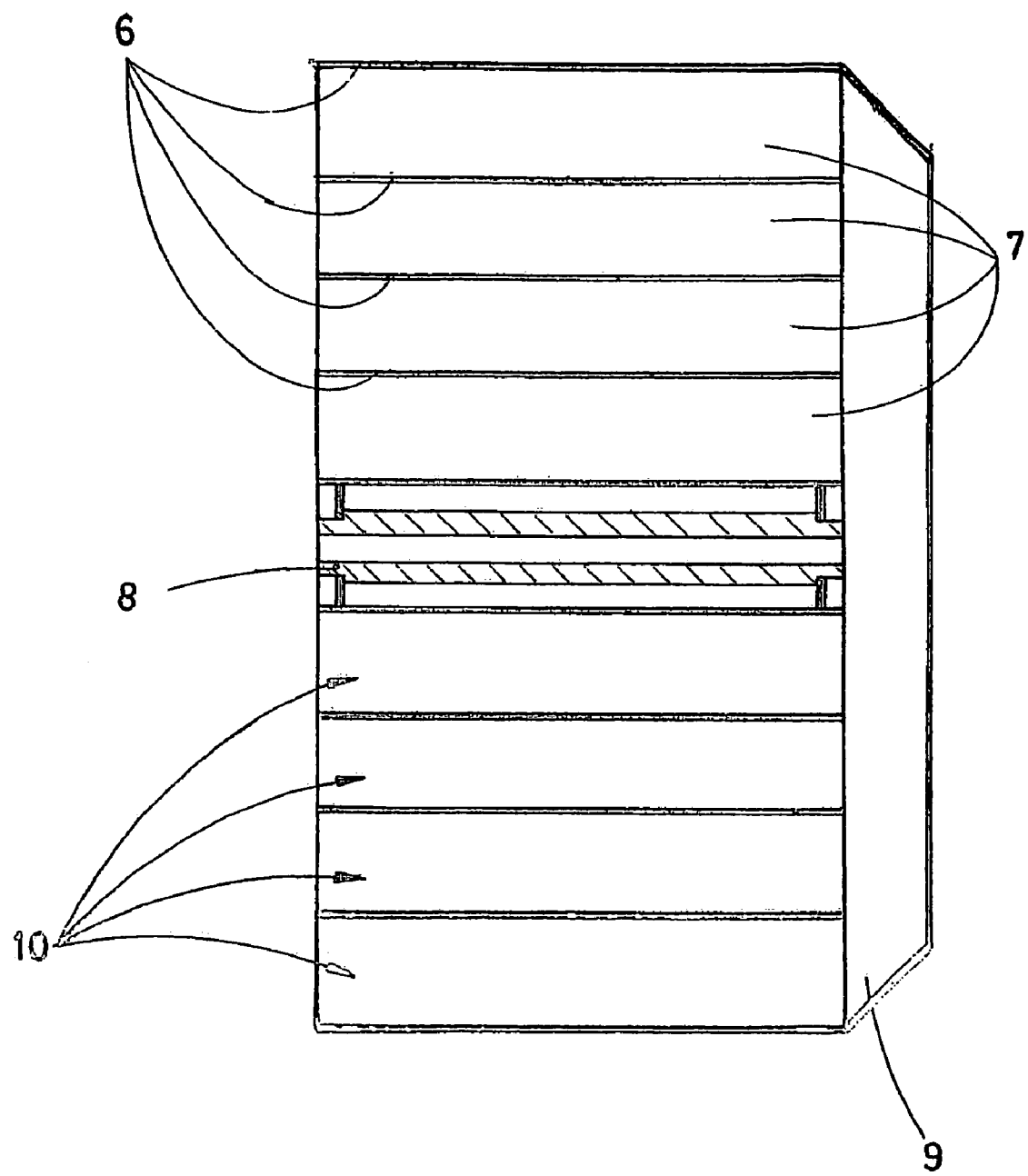

Round honeycomb rotor for wind generators and most propellers with four or more round bent tubular trapezoids is composed of a nucleus (3,7), which is the centre or the rotor; two or more tubular cylinders (1,5) concentrically mounted with pieces (2,6) fitted in between them and forming the round bent tubular trapezoids. In rotors for wind generators the tubular cylinder with largest diameter (1) will have a conical shaped funnel (4) fitted in its entrance and opening outwards. In rotors for most propellers the tubular cylinder with largest diameter (5) will have a conical shaped funnel (8) fitted in its exit and opening inwards. All these different pieces can be assembled by joint traditional methods such as welding, riveting or screwing. The dimensions for wind generator rotor can vary according to the needed capacity being the diameters similar to the dimensions of traditional wind generators. Building materials will have to be light, metallic and corrosion resistant. As for most propellers rotor cast iron or highly resistant and light materials alloy as well as sheathing plastic are recommended.

Figure 5:
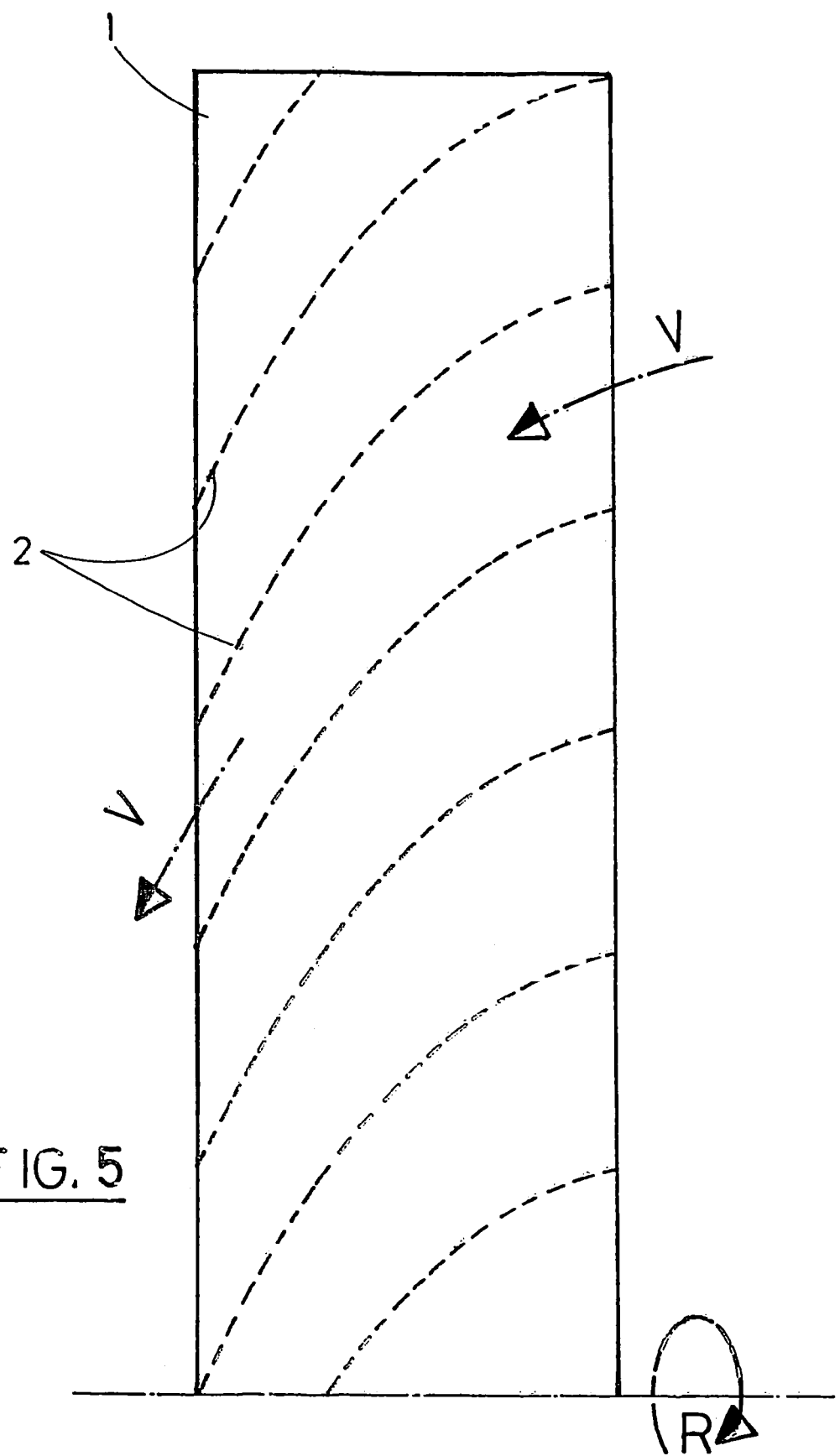
FIG. 5 shows half a section of the wind generator largest tubular cylinder, in which we can appreciate the bending of the pieces fitted in between each round bent tubular trapezoids. We can also appreciate the reduction of wind exit surface in wind generators according to the direction of the "V" arrow and the spin direction according to the "R" arrow.

Round bent tubular trapezoids (2) in wind generators will be mounted in order to minimise the wind exit. This is achieved with larger wind entry surfaces and smaller exit surfaces. Due to the smaller wind exit surface the light pressure that takes place is very important for the large rotor surface, which follows the "V" direction according to FIG. 5.

Figure 6:
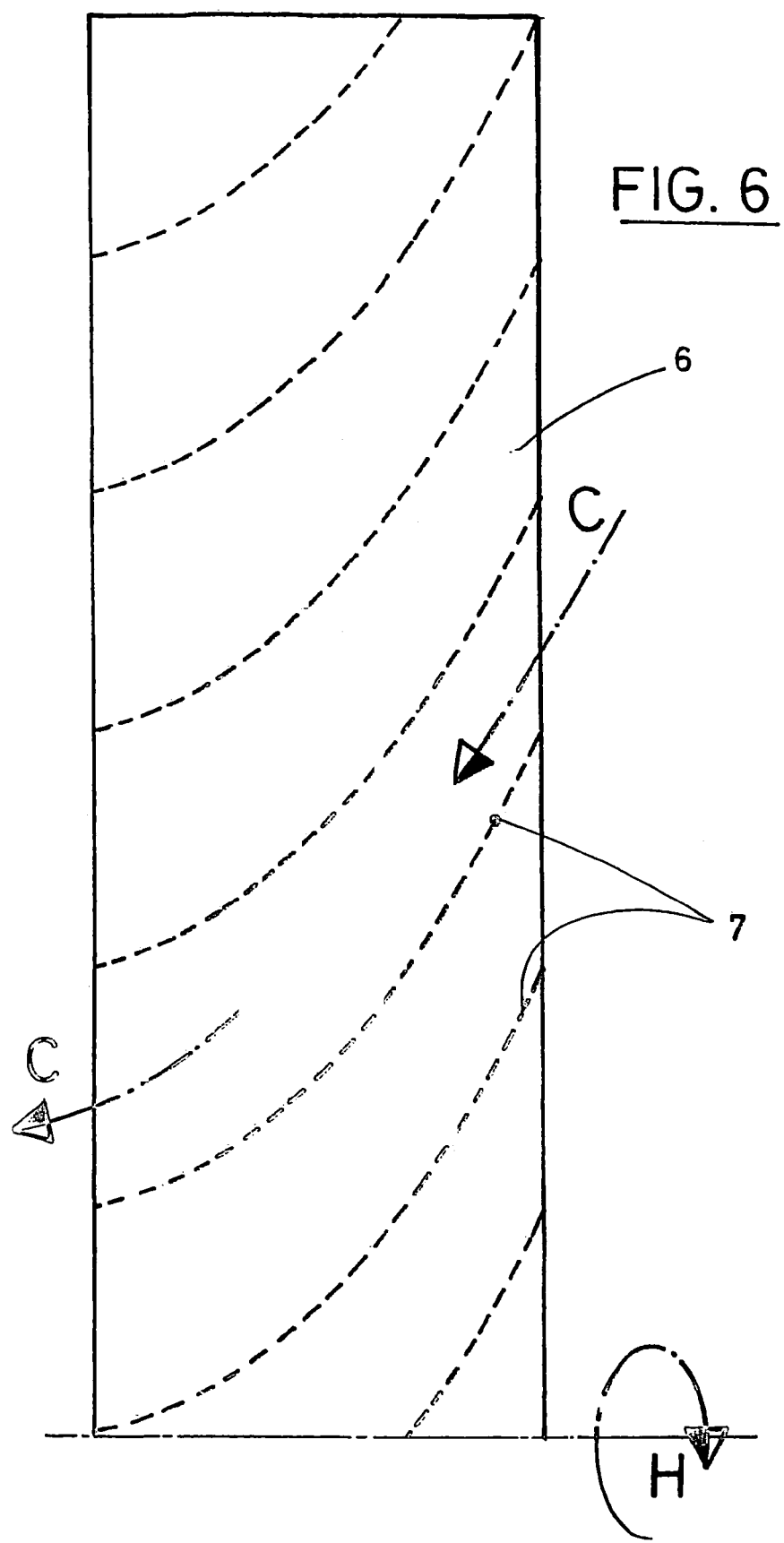
FIG. 6 shows half a section of most propellers largest tubular cylinder, in which we can appreciate the bending of the pieces fitted in between each round bent tubular trapezoids. We can also appreciate the reduction of wind entry surface being the wind exit surface larger, the direction of the wind entrance according to the "C" arrow and the spin direction according to the "H" arrow.

In round honeycomb rotors, propeller pieces and round bent tubular trapezoids (7) will be smaller at entry surfaces and larger at exit surfaces following the "C" direction according to FIG. 6.

The cube or nucleus (3,8) will be fitted on the alternator axis or on the engine according to its fixing characteristics.

Once the industrial object of this present Invention patent has been presented and described clear and extensively enough as to be exploited, I declare it new and of my own invention. Accidental details such as shape, size, materials and building procedures could be subject of alteration according to what has been described and represented in this report if it remains within the speciality resumed in the following claims.

The invention claimed is:

1. A round honeycomb rotor for propellers comprising, curved tubular trapezoids comprising a set of pieces surrounded by tubular cylinders, at the center of said cylinders is an axle operably linked to an alternator or engine, wherein the perimeters of said pieces have round curved tubular trapezoidal shapes being peripherally enclosed by said tubular cylinders which are concentric among themselves and assembled in modules, the positions of said pieces between said concentric tubular cylinders coincide or alternate forming curved trapezoidal shaped tubes that are linked among themselves, wherein the structure of said rotor has a round honeycomb shape with the axle assembled in the middle and operably linked to an alternator or engine, and wherein each tubular cylinder comprises four or more of said pieces and the cylinders are assembled in one or more pairs, wherein said round trapezoidal pieces are curved to allow a larger wind contact surface to maximize wind performance, wherein said curved tubular trapezoids can have any known regular or irregular geometrical shape, wherein said round curved tubular trapezoids have smaller wind entry surfaces and larger wind exit surfaces, and wherein the tubular cylinder comprising the largest diameter comprises an exit funnel comprising a tubular conical shape that reduces wind exit surfaces.

* * * * *